United States Patent [19]

Paassen

[11] Patent Number: 5,050,336

[45] Date of Patent: Sep. 24, 1991

[54] DISPOSABLE ANIMAL TRAP

[76] Inventor: Luke V. Paassen, 941 - 14th St. S., Lethbridge, Alberta, Canada, T1J 2Y9

[21] Appl. No.: 529,559

[22] Filed: May 29, 1990

[51] Int. Cl.⁵ .......................................... A01M 23/00
[52] U.S. Cl. ..................................................... 43/61
[58] Field of Search ................... 43/60, 61, 58, 65, 67

[56] References Cited

U.S. PATENT DOCUMENTS

| | | | |
|---|---|---|---|
| 924,237 | 6/1909 | Kampfe | 43/61 |
| 1,261,189 | 4/1918 | Tremble | 43/61 |
| 1,326,662 | 12/1919 | Kample | 43/61 |
| 2,087,646 | 7/1937 | Houghton | 43/61 |
| 2,434,031 | 1/1948 | Adams | 43/61 |
| 2,437,020 | 3/1948 | Ford | 43/61 |
| 2,454,476 | 11/1948 | Price | 43/60 |
| 2,475,462 | 7/1949 | Rosen | 43/61 |
| 2,518,819 | 8/1950 | Roessler, Jr. | 43/61 |
| 3,992,802 | 11/1976 | La Rue | 43/61 |
| 4,142,320 | 3/1979 | Marcolina | 43/61 |
| 4,231,180 | 11/1980 | Bare | 43/61 |
| 4,238,902 | 12/1980 | Holl et al. | 43/61 |
| 4,238,903 | 12/1980 | Mazzei | 43/61 |
| 4,335,535 | 6/1982 | Lindley | 43/61 |
| 4,462,181 | 7/1984 | Broman | 43/61 |
| 4,468,883 | 9/1984 | Williams | 43/67 |
| 4,550,523 | 11/1985 | Spiller | 43/61 |
| 4,557,067 | 12/1985 | Ha | 43/61 |
| 4,569,149 | 2/1986 | Sensing et al. | 43/61 |
| 4,831,766 | 5/1989 | Giglietti | 43/60 |

FOREIGN PATENT DOCUMENTS

| | | | |
|---|---|---|---|
| 199943 | 5/1920 | Canada . | |
| 1093301 | 1/1981 | Canada | 43/65 |
| 1118997 | 3/1982 | Canada | 43/65 |
| 1134614 | 11/1982 | Canada | 43/65 |

Primary Examiner—Kurt Rowan

[57] ABSTRACT

A small animal trap of a type which can be economically produced and is constructed so that the user can discard it with the captured animal without any exposure to the animal. The trap is in the form of a thin-walled enclosure of resilient plastic with a door flap being formed in the surrounding wall by slits with a portion of the wall adjacent the wall being integrally attached to the door flap so that the resiliency of the plastic allows the door to be bent inwardly to an animal admitting condition but is normally biased to a closed condition in which it is flush with the surrounding wall. The trip member, which may be made separate to the enclosure, is provided for holding the door flap in the open condition and is connected to the door flap or wall in a manner to readily become disconnected if it is slightly moved by an animal entering or by the animal's activities within the enclosure. The entire enclosure, including the door flap can be molded as an integral unit in a single plastic molding step, and the form of the trip member, which may be a second molded part of the trap, can be of a simple form and constructed so as to permit the user to install it when setting the trap.

26 Claims, 2 Drawing Sheets

DISPOSABLE ANIMAL TRAP

BACKGROUND OF THE INVENTION

1. Field of the Invention

This invention relates to an animal trap, and more particularly to a disposable trap for small animals which allows the user to discard the trap containing the captured animal without any exposure to the animal 2. Description of the Prior Art The most common type of trap used for small animals, such as mice, is of the spring loaded type which may be repeatedly set and baited for catching a number of mice, one after the other. This type of trap is provided with a relatively strong spring so as to be capable of killing the mouse as it snaps shut, but occasionally, depending on the mouse's position when the trap is tripped, the mouse is only wounded and is held until it can be destroyed or freed by the user. The chore of removing the mouse from the trap, whether dead or alive, is unpleasant to most users, and additionally, the procedure required in baiting and setting the trap is a sufficiently intricate operation that it frequently results in a scare to the user, if not in bruised fingers, in the event the spring loaded member slips from the user's fingers or the trap is otherwise accidentally tripped.

As a result of the above disadvantages with the most commonly used mouse traps, there have been developed traps having an enclosure, usually a cage provided with a trap door arrangement, into which one or more mice may enter and remain until the user destroys the captured mice or removes them to a different area for release. Such structures are usually large and expensive, and requires some handling, or at least visual contact with the captives.

There have been further certain proposed disposable forms of small animal traps which allow capture of an animal, usually one mouse at a time, with the view of disposing of the trap and captured mouse at the same time. In the main, however, these traps have been of a sufficiently intricate design, often having a number of parts, some of which are moving parts, that the manufacturing and assembling costs are such, the user feels that in spite of the unpleasantness of the more commonly used devices, it is too costly to buy a trap that has only a one-time use.

SUMMARY OF THE INVENTION

It is an object of the present invention to provide a disposable trap which is of a very economical structure and which allows the user to dispose of the captured animal without visual or other type of contact with it.

According to the present invention, there is provided a small animal trap which includes an enclosure formed by a thin wall of resilient plastic defining a chamber of a size to readily house the animal and having a door flap in and separated from the surrounding wall by slits in the wall, a portion of the wall adjacent the door flap being integrally attached to the door flap by a non slitted hinge portion such that the resiliency of the thin-walled plastic allows the door flap to be forcible bent to an animal admitting open condition but normally biases the door flap to a closed condition flush with the surrounding wall. A trip means is connectable between the door flap and the wall for holding the door flap in the open animal admitting condition, the trip means in a connected position being readily disconnectable by activity of an animal entering or within the chamber for permitting the door flap to return to the flush closed condition.

More specifically, the complete wall and door flap of the enclosure constitutes a integral unit molded of plastic.

In an illustrated embodiment of the invention, the trip means includes an elongated tension member arranged to be connected at one end to the door flap and at the other end to the wall at a location substantially diametrically opposed to the door flap for holding the door flap in an inwardly bent open condition.

BRIEF DESCRIPTION OF THE DRAWINGS

In the accompanying drawings with show an embodiment of the invention, as an example.

DESCRIPTION OF THE PREFERRED EMBODIMENTS

Figure 1:
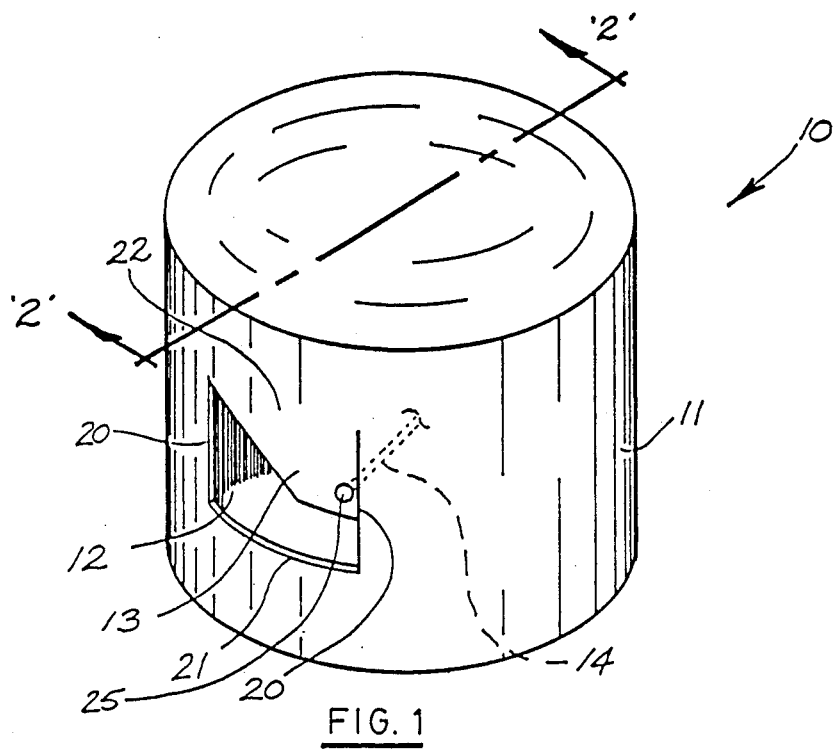
FIG. 1 is a perspective view of the enclosure of the present invention with the door flap held in an open condition.
Figures 2, 3:
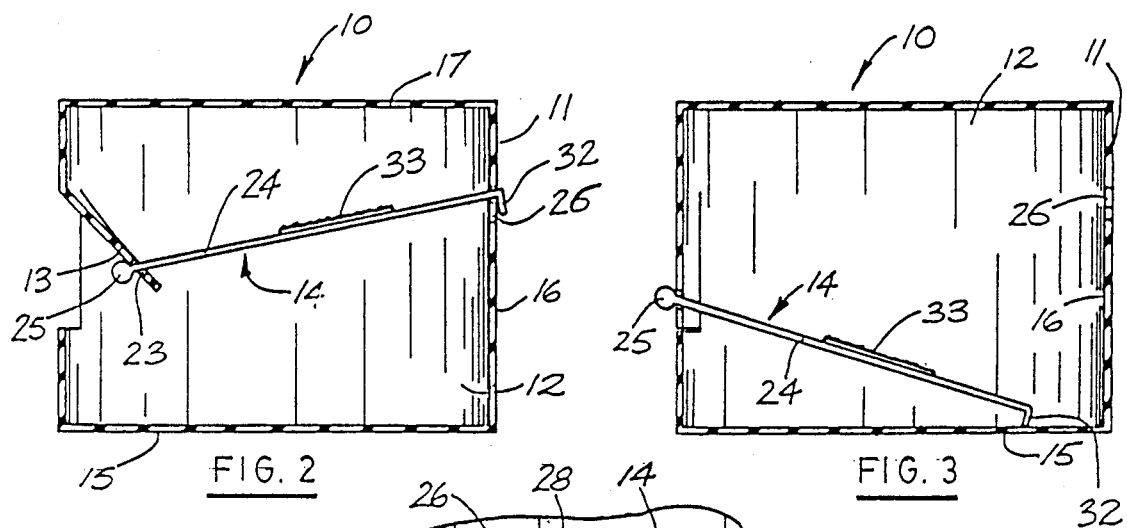
FIG. 2 is a cross sectional view as seen along the line 2—2 of FIG. 1.
FIG. 3 is a view similar to FIG. 2, but with the door flap in a closed condition.

In FIGS. 1 to 3, the reference character 10 denotes the small animal trap of the present invention. The trap 10 includes an enclosure 11 defining a chamber 12 of a size to readily house an animal, such as a mouse, for which the trap is to be set. The enclosure has a door flap 13, and a trip means 14 is connectable between the door flap 13 and enclosure 11 for holding the door flap in an animal admitting open condition as shown in FIGS. 1 and 2.

The enclosure 11 is shown as being cylindrical in shape, having a circular, flat bottom or base 15, a upwardly projecting side wall 16 in the shape of a cylinder, and a circular, flat top 17. It is apparent that the enclosure may be of other shapes, such as a sphere with a flat base, conical or cubical, preferably with rounded corners. The top 17 in the illustrated embodiment could be rounded or domed shape, and the side wall 16 could be frusto-conical as an alternative. It is important, however, that the enclosure does not have any inwardly projecting corners which might be gnawed by a captured animal. The enclosure could be designed to permit the opening of the top, for example, to enable the units to be stacked, one within the other, but it is believed desirable, particularly for the sake of economy, to mold the base, side walls and top as integral unit of a thin-walled nature so as to use as little material as possible and to form a very light structure. Various types of plastics could be used, but again for the sake of low cost, the same type of plastic as used in food containers can used, it only being necessary that the plastic is resilient and not exceptionally soft. The interior of the enclosure 11 is preferably molded very smooth. The dimensions used can vary, of course, depending on the type of animal to be trapped, but for normal mice, for example, the enclosure may be approximately 11 cm. in height, with a diameter of 10 cm.

In the illustrated embodiment, the door flap 13 is defined by three slits, a pair of spaced parallel slits 20, 20 which extend vertically from upper ends which are spaced below top 17, and are joined at their lower ends by a substantially horizontal slit 21. The slits 20, 20 and 21 may be formed in the molding process or can be cut subsequent the removal of the enclosure 11 from the mold. As shown the door flap 13 is rectangular, but the slits 20, 20 could diverge or converge so that the shape of the door flap is trapezoidal. Alternatively, the slits 20, 20 could continue to converge downwardly until they join so that the door flap is triangular. The bottom edge of the door flap 13 formed by the slit 21 is above the base 15 so that there is a portion of the wall 16 below the door flap. The upper ends of the slits 20, 20 are laterally spaced and are below the top 17, as indicated above, so that the door flap is integral with the wall 16 at the top and therefore forms an non-slitted hinge portion 22 between the upper portion of the door flap and the wall thereabove. Accordingly, the resiliency of the thin-walled plastic enclosure normally biases the door flap to a position in which it is flush with the surrounding wall. The edges of the door flap are therefore not exposed to a captured animal so as to be accessible for gnawing. Moreover, because the door flap is completely closed once the animal has been trapped, and there are no other significant accessible openings, the captures animal cannot be seen once the door has been closed, the plastic, of course, being preferably opaque. With the sale of each disposable trap, a small plastic bag and a bag tie can be supplied for use in disposing of the trap and animal.

The trip means 14 is an elongated member, which for the sake of simplicity in molding, may be formed completely separate from the enclosure 11. As shown, the member may be a very thin strand 24 which is flexible or relatively rigid and has means at opposite ends for connecting it between the door flap and the portion of the wall 16 diametrically opposite the door flap, the distance between the connecting means being less than the distance across the chamber 12 so that when the trip means is in place, the door is held in a position bent back into the chamber. As is readily apparent form FIG. 2, the bending takes place mainly along the hinge portion 22 which is on a line substantially extending between the upper ends of slits 20, 20, and the door flat is held back from its normal position to provide sufficient room therebelow to allow the animal to crawl through the open above the edge of the wall provided by slit 21.

The door flap 13 is provided with a small aperture or opening 23 immediately above the slit 21 which defines the bottom edge of the door flap, the size of the opening 23 being slightly greater than the elongated member or strand 24. The connecting means at the associated end of the strand 24 is provided with an enlargement 25 which engages the exterior surface of the door flap surrounding the opening 23 so that it cannot be pulled through the opening. As may most readily be seen in FIG. 4, the connecting means in wall 16 diametrically opposite the door flap is in the form of a small aperture or opening 26. The opening 26 is formed by two spaced vertical leg portions 27, 27 joined at the upper ends thereof by a transverse portion 28 so as to provide an inverted U-shape opening. Formed integrally with the wall 16 and extending upwardly between the leg portions 27, 27 of the opening, is a small tab 30 having an upper edge 31. The connecting means at the end of the elongated member or strand 24 opposite to enlargement 25 is a short portion 32 of the strand 24 which is turned at a substantial right angle relative to the remainder of the strand so as to form a small hook.

Figure 4:
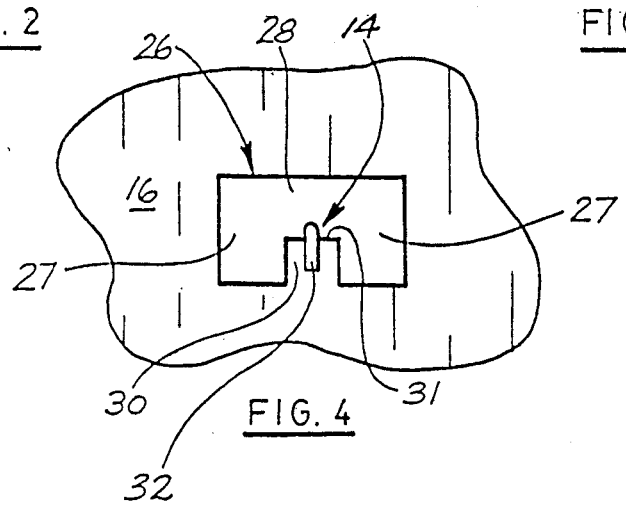
FIG. 4 is an enlarged side view of a portion of the wall of the enclosure showing an opening in the wall providing a connection for the trip means.

As can best be seen in FIG. 4, the length of the short portion 32 may be less than the depth of the transverse portion 28 so that if the trip means 14 is pushed up, the lower end of the hook clears the upper edge of the tab 30 so that the outer end of the trip means is pulled into the chamber 12 due to the resiliency provided by the hinge portion 22 of the door flap 14. In practice, the resiliency of the hook and the tab 30 may permit sufficient bending of these elements that the hook can disengage even before the short portion 32 has been raised only a small distance relative to the tab. The width of vertical portions 27, 27 of the opening 26 is greater than the thickness of the strand 24 and its short end portion 32 so that as the trip means is pushed sideways in either direction, the hook clears the end edges of the tab and the outer end of the trip means is again pulled into the chamber 12 as the door flap returns to its normal flush position relative to the wall 16. Also the resiliency of the hook and the tab may be selected to permit relative bending of one or both in the event a substantial downward force is applied to the elongated member and thereby allow the hook to clear the tab.

In the illustrated embodiment, the opening 26 is located above the level of the opening 23 so that the elongated member or strand 24 slopes downwardly from the opening 26 even when the door flap 13 is in a fully open condition. This ensures a better hooking action between the short portion 32 and the tab 32, and additionally, there is a tendency for the animal to enter the chamber completely below the strand and the raise up under it and cause immediate disengagement of the trip means.

The trip means 14 can be supplied to the user in the same box which contains the enclosure 11, or if sold without a container, the trip means could be simply adhered to the outside of the enclosure. Alternatively if sold in a quantity, the same number of trip means 14 could be supplied is a separate container. When the user wishes to set the trap, the end of the trip means 14 having the hook is first threaded thought the opening 23 from the outside of the door flap 13, and the entire strand 24 is pushed though the opening until the enlargement engages the door flap. The door flat is then pushed inwardly with the user's finger until the short portion 32 can be pushed though the opening 26 and hooked over the upper edge 31 of the tab 30. Thus when the door flap is released, it is held in the animal admitting condition shown in FIGS. 1 and 2.

As an alternative, it is possible to mold the trip means permanently attached to the inside surface of the door or to otherwise attach it subsequently to molding, but this arrangement may, of course, add to the manufacturing costs.

There is preferably adhered to the strand, intermediate its ends, bait 33 to which the animal is attracted by smell and is tempted to eat. On entering the chamber 12 thought the opening provided by the bent in door flap 13, its initial activity may result in the strand 24 being bumped sufficiently hard to cause disengagement of the hook from the tab 30 so that the door flap closes and traps the animal. As shown in FIG. 3, the trip means simply falls to the floor or base 15 as the door flap closes. In the event the trip means is not disengaged by the animals movement, the animal's biting at the bait will be sufficient to cause immediate disengagement of the hook. The bait may be applied to the strand 24 in such a manner that as the animal bites at the bait, the strand will be severed which will have the same effect as the hook being disengaged so that the door flap will spring closed.

Once the animal has been trapped, it is not necessary for the user to again open the door flap as the enclosure and the animal contained therein may be discarded. It is possible to include in the bait 33 a substance which is lethal to the animal so that it quickly perishes after being caught. If it is believed preferable not to treat the bait on the trip means with the lethal substance because the trip means may be externally exposed as sold, the bait and the lethal substance or the lethal substance alone could be applied to an internal surface of the chamber 12.

The connecting means at both ends of the trip means 14, can be made in the same hook form and the door could be provided with an opening of the same form as opening 26 so that the strand 24 could be tripped from either end, but for ease of setting, the illustrated arrangement is believed preferable.

Figure 5:
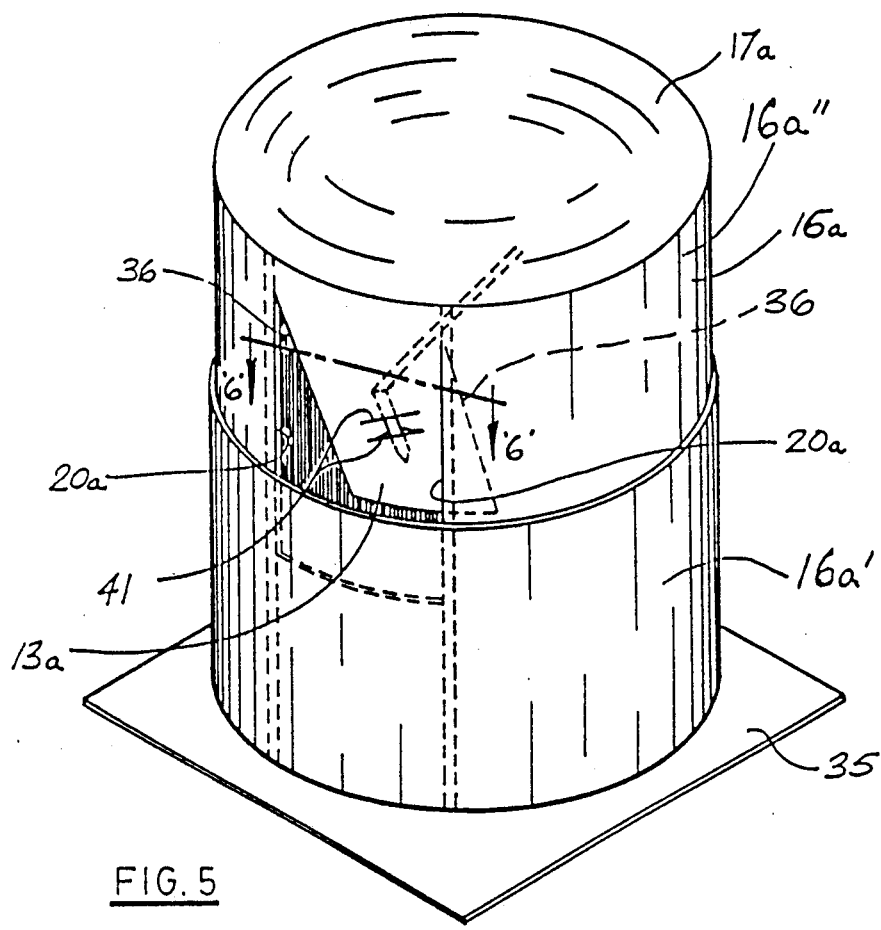
FIG. 5 is a perspective view similar to FIG. 1, but of another embodiment of the invention.
Figure 6:
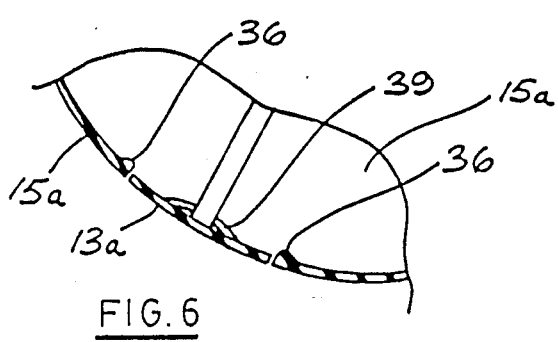
FIG. 6 cross sectional view of the embodiment of FIG. 5 as seen from the line 6—6 of FIG. 5, but with the door flap in a closed position.
Figure 7:
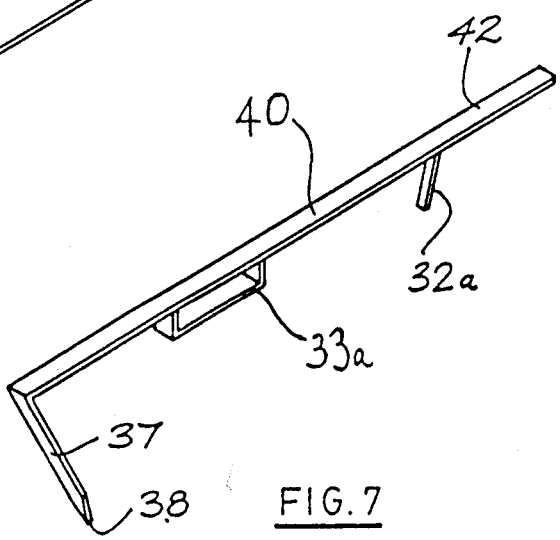
FIG. 7 is a perspective view of alternative embodiment of the trip means as used in the embodiment of FIG. 5.

In the embodiment shown in FIG. 5, the trap 10a is provided with a bottom plate or horizontal flange 35 which may be in the same plane as bottom or base 15 and projects a few centimeters outwardly from the side wall 16a. The flange 35 stabilizes the trap so that motion of a trapped animal within the enclosure does not cause the trap to tip and roll.

Also to reduce the tendency of the trapped animal to gnaw at the edge of the door flap 13a, there is provided a pair of vertically extending rounded ribs 36, 36 on the inside of wall 16a located immediately adjacent the vertical slits 20a, 20a at the edges of the door flap 13a. The ribs 36, 36 extend from the bottom 16a to the top 17a and also stiffen the side wall 16a in the area of the door which enhances the resiliency which effects the return of the door flap to the closed position.

The manner in which the trip means 14a attaches to the door flap is of a different nature. The trip means 14a consist of a thin rigid rod or bar member 40 which has a flat hook or tab 37 which is normal to the axis of the bar member or preferably slants backward at a slight angle. The tab 37 is relatively thin and has a pointed lower tip 38. As best seen in FIG. 5, instead of an opening, such as 23 in the above described embodiment, the door has a pair of closely spaced horizontal slits 41, 41 near the bottom edge, the slits being longer than the width of tab 37, and being separated by a strip 39 of the door flap disposed therebetween. The rod member 40 is longer than the diametrical width of the enclosure so that when the door is closed, the rod member 40 can be inserted through the opening 27 on the opposite side of the trap, and pushed, tab first, until the tab 37 engages the door. The rod member can then be pushed to a position so that the tip 38 can be maneuvered through the top slit 41, on the outside of the door flap between the slits, and then through the bottom slit 41. While this operation is being carried out, the rod member 40 is held by an outer tail portion 42 of the rod member which still projects out through the opening 27 because of the greater length of the rod member.

Once the tab 37 is hooked into the slits 41, 41 of the door flap 13a, the rod member is pulled back to open the door flap until the small hook 32a corresponding to the short portion 32 of the above embodiment can be hooked over the tab 30. The hook 32a is spaced inward from the outer end of tail portion, of course, so that as the hook 32a is positioned to engage the tab 30 the door flap is pulled to the fully open position, and the hook is preferably slanted slightly toward the inner end of the rod member 40. Between the tab 37 and the hook 32a the rod member 40 is provided with a bait box 33a.

The enclosure shown in FIG. 5 is not formed as an integral unit, but of two separate pieces, the bottom piece 16a' being in the form of a short collar section of a diameter to slidingly receive the top piece 16a'' which is in the form of an inverse cup. The collar section has sufficient height to slightly overlap the bottom of the door opening so as to provide a stop against the door flap being pushed outwardly.

Another manner in which a stop can be provided to prevent the door being pushed outward by an entrapped animal is to adhere a short narrow piece of plastic material across the bottom of the door opening once the enclosure has been molded as an integral unit as described in the first embodiment above.

As indicated above the entire, the enclosure 11 is preferably opaque so that when the door is closed, the trapped animal cannot be seen. When the flap door is found closed, one can normally tell if the enclosure contains an animal because the weight of an empty enclosure is very light as compared to one containing the animal. However, if desired, the enclosure can be made semi-transparent or have a transparent spot to facilitate checking a sprung trap.

It will be readily apparent that additional variations would be obvious to those skilled in the art without departing from the spirit of the invention as defined in the appending claims.

What I claim is:

1. A small animal trap comprising:
   an enclosure formed by a thin wall of resilient plastic defining a chamber of a size to readily house the animal, said wall being a cylindrical side wall, a door flap being formed in and separated from the surrounding wall by slits in the wall, a portion of the wall adjacent the door flap being attached to the door flap by a non-slitted hinge portion such that the resiliency of the thin-walled plastic allows the door flap to be forcibly bent inwardly to an animal admitting open condition but normally biases the door flap to a closed condition flush with the surrounding wall, the complete wall and door flap of the enclosure being formed as a integral unit molded of plastic, the integral unit including a flat base, the cylindrical side wall and a top, and
   a trip means connectable between the door flap and the wall for holding the door flap in the open animal admitting condition, said trip means in a connected position being readily disconnectable by activity of an animal entering or within the chamber for permitting the door flap to return to the flush closed condition.

2. The animal trap defined in claim 1, wherein said door flap is formed by at least a pair of downwardly extending slits having the upper ends thereof spaced to form said hinge portion.

3. The animal trap as defined in claim 1, and further comprising a flange in the same plane as said flat base and projecting outward from said side wall.

4. The small animal trap comprising:

an enclosure formed by a thin wall of resilient plastic defining a chamber of a size to readily house the animal, a door flap being formed in and separated from the surrounding wall by slits in the wall, a portion of the wall adjacent the door flap being integrally attached to the door flap by a non-slitted hinge portion such that the resiliency of the thin-walled plastic allows the door flap to be forcible bent to an animal admitting open condition but normally biases the door flap to a closed condition flush with the surrounding wall, the non-slitted hinge portion of the door flap being at the top of the door flap in said side wall, the door flap being defined at least in part by downwardly extending slits, and further including a strip extending between the slits and the outside of said enclosure and overlapping with the bottom of said door flap for preventing said door flap from being pushed outwardly from said closed position, and a trip means connectable between the door flap and the wall for holding the door flap in the open animal admitting condition, said trip means in a connected position being readily disconnectable by activity of an animal entering or within the chamber for permitting the door flap to return to the flush closed condition.

5. A small animal trap comprising:

an enclosure formed by a thin wall of resilient plastic defining a chamber of a size to readily house the animal, said wall being an upwardly projecting side wall surrounding said chamber, a door flap being formed in and separated from the surrounding side wall by slits in the wall, a portion of the wall adjacent the door flap being attached to the door flap by a non-slitted hinge portion such that the resiliency of the thin-walled plastic allows the door flap to be forcible bent to an animal admitting open condition but normally biases the door flap to a closed condition flush with the surrounding wall, the complete wall and door flap of the enclosure being formed as a integral unit molded of plastic, the integral unit including a base on which the trap is normally placed and the upwardly projecting side wall surrounding said chamber, trip means including an elongated tension member arranged to be connected at one end to the door flap and at the other end to the side wall at a location substantially diametrically opposed to the door flap for holding the door flap in an inwardly bent open animal admitting condition, said trip means in a connected position being readily disconnectable by activity of an animal entering or within the chamber for permitting the door flap to return to the flush closed condition.

6. The animal trap defined in claim 5, wherein the non-slitted hinge portion of the door flap is at the top of the door flap in said side wall, the door flap being defined at least in part by downwardly extending slits, and wherein said trip means includes a separate member connectable at one end to the door flap and extending to and being connected at the opposite end thereof to the wall at the side of the chamber opposite to the door flap.

7. The animal trap defined in claim 6, wherein at least one of the connections of the member between the door flap and the wall is formed to permit easy disconnection on minor movement of the member.

8. The animal trap defined in claim 7, wherein a bait is provided on the member intermediate the ends thereof.

9. The animal trap defined in claim 8, wherein said bait has a substance lethal to said animal to be trapped in said chamber.

10. The animal trap of 5, wherein said enclosure includes a substance lethal to the animal to be trapped within the chamber.

11. The animal trap of claim 5, wherein said member forming said trip means includes a strand having spaced connection means formed thereon, the spacing of the connecting means being such that when one connection means is connected to an associated connection means on said door flap and the other connection means is connected to an associated connection means on said wall, said door flap is held inwardly of the wall in the bent open condition.

12. The animal trap defined in claim 11, wherein the connection means on one of said door flap and wall includes a small opening through which said strand may readily pass and wherein the associated connection means on said strand includes an enlargement to prevent further passage of the member therethrough whereby the strand may be threaded through the opening until said enlargement is engaged.

13. The animal trap defined in claim 11, wherein the connection means on one end of the member is a disengagable connection and includes a short portion turned at an abrupt angle to the strand, and the associated connection means of at least one of the door flap and wall includes an aperture through which the short portion is removably hooked whereby contact of the member by an animal located within the chamber causes ready unhooking of the short portion so that the door flap springs back to the flush closed condition.

14. The animal trap defined in claim 13, wherein the other connection means of the member includes an enlarged portion, and the associated connection means of the door flap and wall is in the form of an opening of a size smaller than the enlargement to prevent passage of the member through said opening past said enlargement, and wherein said disengagable connection being formed by said short portion is configured for passage through said opening whereby the member may be threaded through said opening by first passing the disengagable connection through the opening and continuing to feed said member through said opening until said enlargement is engaged.

15. The animal trap of claim 13, wherein said aperture consists of two leg portions joined at one end by a transverse portion thus providing a substantially U-shaped opening in at least one the door flap and the wall, said U-shaped opening providing a small tab between said leg portion to which said short portion may be hooked whereby movement of said member causing movement of said short portion towards either of said legs or said transverse portions of said aperture results in disengagement of the connections means.

16. The animal trap defined in claim 5, wherein said enclosure is molded of opaque plastic.

17. The animal trap as defined in claim 5, wherein said trip means includes a rigid rod member of greater length than the enclosure width, and wherein said wall is provided with an opening at said substantially diametrically opposed location, said rod member having an outer tail portion for projecting through said opening.

18. The animal trap as defined in claim 17, wherein said rod member has a hook projecting therefrom at a distance from the outer end of said tail portion for engagement with an edge of said opening as said door flap is pulled to the open condition, said hook being disposed for ready disengagement on slight movement od said rod member.

19. The animal trap as defined in claim 18, wherein connection means is provided for attaching an inner end of said rod member to the inside of said door flap, said connection means including a flat tab formed on the inner end of the rod member and in a plane substantially normal to the axis of said rod member, said door flap having a pair of closely spaced slits of a length greater than the width of said tab for sliding reception of said tab therethrough.

20. An animal trap as defined in claim 19, wherein said tab has a pointed tip for facilitating passage of said tab outwardly through one of the pair of slits and inwardly through the other slit.

21. A small animal trap comprising:
an enclosure formed by a thin wall of resilient plastic defining a chamber of a size to readily house the animal, said wall being a cylindrical side wall,
a door flap being formed in and separated from the surrounding wall by at least a pair of downwardly extending slits in the wall, the complete wall and door flap of the enclosure being formed as a integral unit molded of plastic, the integral unit including a flat base, the cylindrical side wall and a top, said downwardly extending slits being substantially vertically disposed in said cylindrical wall and being joined at the lower ends thereof by a substantially horizontal slit defining the bottom edge of the door flap at a short distance above said flat base a portion of the wall adjacent the door flap being attached to the door flap by a non-slitted hinge portion such that the resiliency of the thin-walled plastic allows the door flap to be forcible bent to an animal admitting open condition but normally biases the door flap to a closed condition flush with the surrounding wall, and
a trip means connectable between the door flap and the wall for holding the door flap in the open animal admitting condition, said trip means in a connected position being readily disconnectable by activity of an animal entering or within the chamber for permitting the door flap to return to the flush closed condition.

22. The animal trap defined in claim 21, wherein said trip means includes an elongated strand having first connecting means at one end for attachment to the door flap and second connecting means at the other end for releasable attachment to the side wall at a location substantially diametrically opposed to the door flap, the length of said strand between the first and second connecting means being less than the diameter of the cylindrical side wall whereby said door flap is held in an inwardly hinged condition when the strand is attached in place.

23. The animal trap defined in claim 22, wherein said door flap has an opening near the bottom edge thereof, the second connecting means being passable through said opening, and the first connecting means being an enlargement in said strand incapable of passing through the opening, whereby the strand and said enclosure are formed separately and said strand can be attached ot the door flap by first passing the second connecting means inwardly through the opening and then feeding the strand through the opening until the enlargement engages an outer side of the door flap.

24. The animal trap as defined in claim 23, wherein said second connecting means includes a hook member formed by a short portion turned at substantially right angles to the elongated strand, and wherein said cylindrical wall has an opening at a location substantially diametrically opposed to the door flap, said opening being defined by an edge over which the short portion can be hooked to hold the door flap in the open condition and of sufficient size to permit the hook member to pull longitudinal through the opening when moved to be released from said edge.

25. The animal trap as defined in claim 24, wherein said opening in said cylindrical wall is at a level above the flat base higher than the opening in said door flap, said opening having two spaced vertical leg portions joined at the upper ends thereof by a transverse portion so as to form an opening of the shape of an inverted U, an upwardly projecting tab thus being formed between the leg portions, whereby the hook member may be fastened over the top of the tab and either upward or sideways movement of the strand will move the hook member to a location where it can withdraw through the opening under the biasing effect of the door flap.

26. A small animal trap comprising:
an enclosure formed by a thin wall of resilient plastic defining a chamber of a size to readily house the animal, said wall being a cylindrical side wall, a door flap being formed in and separated from the surrounding wall by slits in the wall, the complete wall and door flap of the enclosure being formed as a integral unit molded of plastic, the integral unit including a flat base, the cylindrical side wall and a top, pair of thickened rib portions on the inner surface of said on either side of the slits defining the edges of said door flap a portion of the door flap at the top of the door flap attached to the door flap by a non-slitted hinge portion such that the resiliency of the thin-walled plastic allows the door flap to be forcible bent to an animal admitting open condition but normally biases the door flap to a closed condition flush with the surrounding wall, and
a trip means in the form of a separate member connected at one end to the door flap and at the opposite end to the wall of the chamber opposite to the door flap for holding the door flap in the open animal admitting condition, said trip means in a connected position being readily disconnectable by activity of an animal entering or within the chamber for permitting the door flap to return to the flush closed condition.

* * * * *